United States Patent
Chen et al.

(10) Patent No.: US 12,309,105 B2
(45) Date of Patent: May 20, 2025

(54) COMMUNICATION APPARATUS AND METHOD FOR HANDLING A TRACKING REFERENCE SIGNAL SCHEDULING

(71) Applicant: MediaTek Singapore Pte. Ltd., Singapore (SG)

(72) Inventors: Biwei Chen, Shanghai (CN); Yabo Li, San Jose, CA (US); Fei Xu, Beijing (CN); Yaochao Liu, Beijing (CN); Yen-Chen Chen, Hsinchu (TW); Chii-Horng Chen, Hsinchu (TW); Mingjun Xu, Beijing (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 395 days.

(21) Appl. No.: 17/874,260

(22) Filed: Jul. 26, 2022

(65) Prior Publication Data
US 2024/0022385 A1   Jan. 18, 2024

(30) Foreign Application Priority Data
Jul. 13, 2022 (CN) .......................... 202210825671.6

(51) Int. Cl.
*H04W 52/02* (2009.01)
*H04L 5/00* (2006.01)
*H04L 43/16* (2022.01)
*H04W 56/00* (2009.01)

(52) U.S. Cl.
CPC .......... *H04L 5/0094* (2013.01); *H04L 5/0048* (2013.01); *H04L 5/006* (2013.01); *H04L 43/16* (2013.01); *H04W 52/0212* (2013.01)

(58) Field of Classification Search
CPC ..... H04L 5/0094; H04L 5/0048; H04L 5/006; H04L 43/16; H04W 52/0212
USPC ........................................................ 370/311
See application file for complete search history.

(56) References Cited

U.S. PATENT DOCUMENTS

| 2013/0114535 | A1* | 5/2013 | Ng ..................... | H04W 72/0446 |
| | | | | 370/329 |
| 2015/0181543 | A1* | 6/2015 | Hwang ............... | H04W 56/001 |
| | | | | 370/336 |
| 2019/0254069 | A1* | 8/2019 | Ahn ..................... | H04L 27/0006 |
| 2020/0136767 | A1* | 4/2020 | Ernström .............. | H04L 5/0053 |
| 2020/0236730 | A1* | 7/2020 | Shin .................... | H04W 56/001 |
| 2020/0295979 | A1* | 9/2020 | Saito .................... | H04W 72/23 |

(Continued)

OTHER PUBLICATIONS

3rd Generation Partnership Project; Technical Specification Group Radio Access Network; NR; Physical layer procedures for data(Release 17) 3GPP Technical Specification Jun. 23, 2022, https://www.3gpp.org/ftp/Specs/archive/38_series/38.214/38214-h20.zip, pp. 1-227, Jun. 23, 2022.

*Primary Examiner* — Mark G. Pannell
(74) *Attorney, Agent, or Firm* — Winston Hsu

(57) ABSTRACT

An embodiment of the invention provides a communication apparatus comprising a radio transceiver and a modem processor. The radio transceiver is configured to transmit or receive wireless signals in a wireless network. The modem processor is coupled to the radio transceiver and configured to perform operations comprising: dividing a tracking reference signal (TRS) set into a plurality of TRS subsets; scheduling a first part of the plurality of TRS subsets for a beam management; and scheduling a second part of the plurality of TRS subsets for a synchronization.

18 Claims, 7 Drawing Sheets

(56) References Cited

U.S. PATENT DOCUMENTS

| | | | |
|---|---|---|---|
| 2021/0044401 A1* | 2/2021 | Yoon | H04B 7/088 |
| 2021/0058215 A1* | 2/2021 | Si | H04L 5/001 |
| 2021/0068193 A1* | 3/2021 | Kong | H04W 52/028 |
| 2021/0288773 A1* | 9/2021 | Lin | H04W 56/001 |
| 2021/0359812 A1* | 11/2021 | Bai | H04L 5/0048 |
| 2023/0051117 A1* | 2/2023 | Tsai | H04L 5/0048 |
| 2023/0142355 A1* | 5/2023 | Xu | H04W 68/005 |
| | | | 370/329 |
| 2023/0224811 A1* | 7/2023 | Xu | H04W 56/0035 |
| | | | 370/311 |
| 2023/0276408 A1* | 8/2023 | Zhou | H04W 56/0015 |

* cited by examiner

COMMUNICATION APPARATUS AND METHOD FOR HANDLING A TRACKING REFERENCE SIGNAL SCHEDULING

BACKGROUND

A channel state information reference signal (CSI-RS) plays an important role in 5G (fifth generation) New Radio (NR). In 5G NR, the CSI-RS is used for the synchronization (e.g., the time/frequency tracking), the CSI computation, the Layer 1 Reference Symbol Received Power (L1-RSRP) computation and the mobility. A tracking reference signal (TRS) is a type of the CSI-RS, and is measured by a User Equipment (UE) to perform the synchronization (e.g., track a time offset and/or a frequency offset). To compensate a path loss in a 5G NR Frequency Range 2 (FR2) system, the UE is equipped with multiple antennas in an antenna-array. For a downlink (DL) data reception, TRS sets for a beam management and the synchronization are needed by the UE. In the conventional design, the beam management and the synchronization cannot be operated in the same TRS set, and the data rate is reduced and the power consumption is increased.

Therefore, a communication apparatus and a method for handling the TRS scheduling to improve the data rate and the power consumption are highly required.

SUMMARY

It is an objective of the invention to provide a communication apparatus, in order to solve the above problem.

An embodiment of the invention provides a communication apparatus comprising a radio transceiver and a modem processor. The radio transceiver is configured to transmit or receive wireless signals in a wireless network. The modem processor is coupled to the radio transceiver and configured to perform operations comprising: dividing a tracking reference signal (TRS) set into a plurality of TRS subsets; scheduling a first part of the plurality of TRS subsets for a beam management; and scheduling a second part of the plurality of TRS subsets for a synchronization.

An embodiment of the invention provides a communication apparatus comprising a radio transceiver and a modem processor. The radio transceiver is configured to transmit or receive wireless signals in a wireless network. The modem processor is coupled to the radio transceiver and configured to perform operations comprising: scheduling a tracking reference signal (TRS) set for a beam management or a synchronization as default; dividing the TRS set into a plurality of TRS subsets, scheduling a first part of the plurality of TRS subsets for the beam management, and scheduling a second part of the plurality of TRS subsets for the synchronization, if an average (AR) signal-to-noise ratio (SNR) of the TRS set is not smaller than a first threshold and a one-shot (OS) SNR of the TRS set is not smaller than a second threshold; and scheduling the TRS set for the beam management or the synchronization, if the AR SNR of the TRS set is not greater than a third threshold or the OS SNR of the TRS set is not greater than a forth threshold.

An embodiment of the invention provides a method for handling a tracking reference signal (TRS) scheduling, comprising: dividing a tracking reference signal set into a plurality of TRS subsets; scheduling a first part of the plurality of TRS subsets for a beam management; and scheduling a second part of the plurality of TRS subsets for a synchronization.

An embodiment of the invention provides a method for handling a tracking reference signal (TRS) scheduling, comprising: scheduling a tracking reference signal set for a beam management or a synchronization as default; dividing the TRS set into a plurality of TRS subsets, scheduling a first part of the plurality of TRS subsets for the beam management, and scheduling a second part of the plurality of TRS subsets for the synchronization, if an average (AR) signal-to-noise ratio (SNR) of the TRS set is not smaller than a first threshold and a one-shot (OS) SNR of the TRS set is not smaller than a second threshold; and scheduling the TRS set for the beam management or the synchronization, if the AR SNR of the TRS set is not greater than a third threshold or the OS SNR of the TRS set is not greater than a forth threshold.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
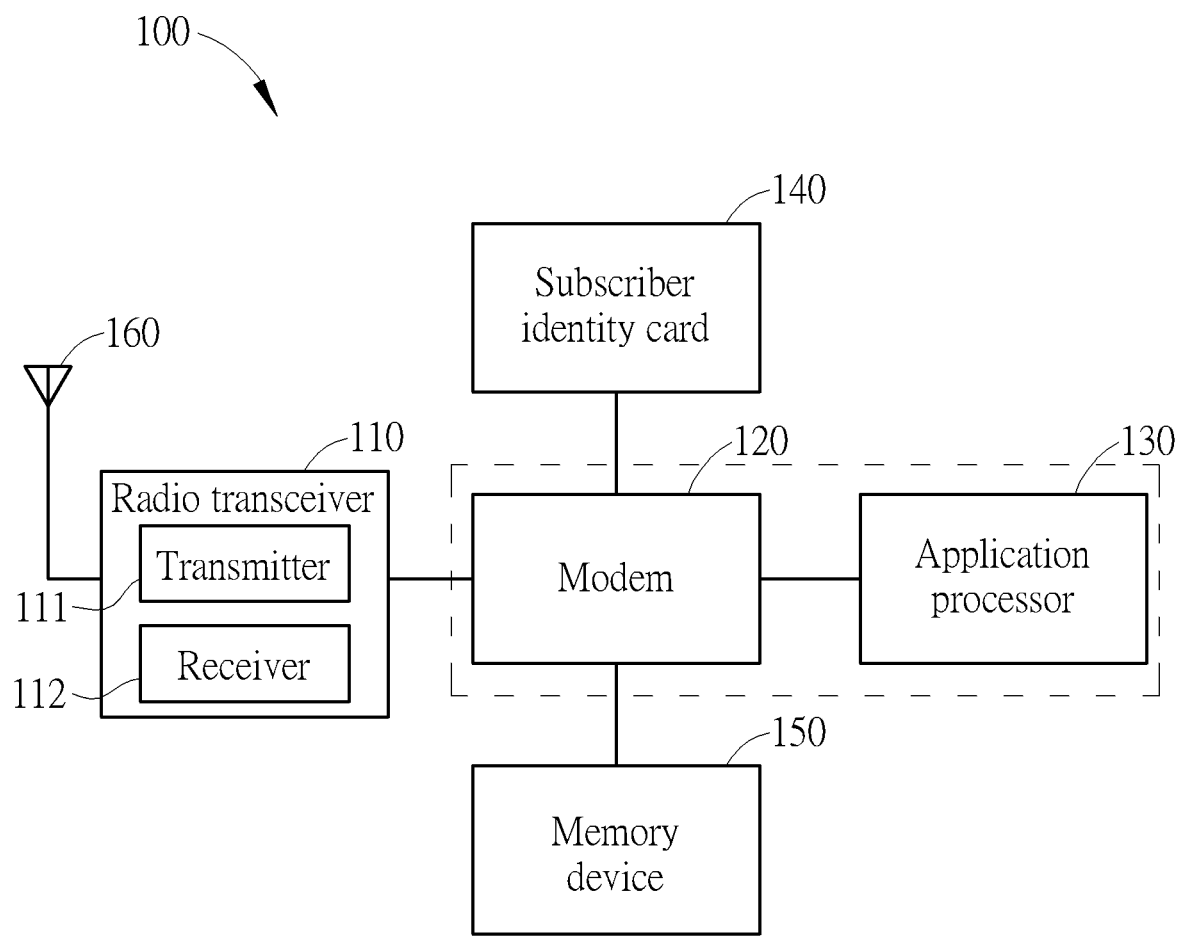
FIG. 1 is an exemplary block diagram of a communication apparatus according to an embodiment of the invention.

FIG. 1 is an exemplary block diagram of a communication apparatus 100 according to an embodiment of the invention. The communication apparatus 100 may be a portable electronic device, such as a Mobile Station (MS), which may be interchangeably referred to as User Equipment (UE). The communication apparatus 100 may comprise a radio transceiver 110, a modem 120, an application processor 130, a subscriber identity card 140, a memory device 150 and at least one antenna 160. The radio transceiver 110 may be configured to transmit and/or receive wireless signals to and/or from a network device in a wireless network via the antenna module, so as to communicate with the network device via a communication link established between the communication apparatus 100 and the network device. The radio transceiver 110 may comprise a receiver 112 configured to receive wireless signals and a transmitter 111 configured to transmit wireless signals. The radio transceiver 110 may be further configured to perform radio frequency (RF) signal processing. For example, the receiver 112 may convert the received signals into intermediate frequency (IF) or baseband signals to be processed, or the transmitter 111 may receive the IF or baseband signals from the modem 120 and convert the received signals into wireless signals to be transmitted to the network device in the wireless network or in an access network (e.g., acellular network or a wireless local access network). According to an embodiment of the invention, the network device may be a cell, a Node-B (NB), an evolved Node-B (eNB), a g Node-B (gNB), a base station, a Mobility Management Entity (MME), an Access and Mobility Management Function (AMF) device, etc., at the network side and communicating with the communication apparatus 100 by the wireless signals via the communication link.

The transmitter 111 and the receiver 112 of the radio transceiver 110 may comprise a plurality of hardware devices to perform RF conversion and RF signal processing. For example, the transmitter 111 and/or the receiver 112 may comprise a power amplifier for amplifying the RF signals, a filter for filtering unwanted portions of the RF signals and/or a mixer for performing radio frequency conversion. According to an embodiment of the invention, the radio frequency may be, for example, the frequency of any specific frequency band for a LTE system, or the frequency of any specific frequency band for a 5G NR system, etc.

The modem 120 may be configured to handle corresponding communication protocol operations and processing the IF or baseband signals received from or to be transmitted to the radio transceiver 110. The application processor 130 is configured to run the operating system of the communication apparatus 100 and to run application programs installed in the communication apparatus 100. In the embodiments of the invention, the modem 120 and the application processor 130 may be designed as discrete chips with some buses or hardware interfaces coupled therebetween, or they may be integrated into a combo chip (i.e., a system on chip (SoC)), and the invention should not be limited thereto.

The subscriber identity card 140 may be a subscriber identity module (SIM), universal mobile telecommunication system (UMTS) SIM (USIM), removable user identity module (R-UIM) or code division multiple access (CDMA) SIM (CSIM) card, or the like and may typically contain user account information, an International Mobile Subscriber Identity (IMSI) and a set of SIM application toolkit (SAT) commands and may provide storage space for phone book contacts. The memory device 150 may be coupled to the modem 120 and application processor 130 and may store system data or user data.

It should be noted that, in order to clarify the concept of the invention, FIG. 1 presents a simplified block diagram in which only the elements relevant to the invention are shown. For example, in some embodiments of the invention, the communication apparatus may further comprise some peripheral devices not shown in FIG. 1. In another example, in some embodiments of the invention, the communication apparatus may further comprise a central controller coupled to the modem. 120 and the application processor 130. Therefore, the invention should not be limited to what is shown in FIG. 1.

In some embodiments of the invention, the communication apparatus is capable of supporting multiple radio access technologies (RATs) communications via the single-card structure as shown in FIG. 1. It should be noted that, although FIG. 1 shows a single-card application, the invention should not be limited herein. For example, in some embodiments of the invention, the communication apparatus may comprise multiple subscriber identity cards to support the multi-RATS communications, in either a single-standby or a multiple-standby manner. In the multi-RATS communication applications, the modem, the radio transceiver and/or the antenna module may be shared by the subscriber identity card(s) and may have the capability of handling the operations of different RATS and processing the corresponding RF, IF or baseband signals in compliance with the corresponding communication protocols.

In addition, those who are skilled in this technology can still make various alterations and modifications based on the descriptions given above to derive the communication apparatuses comprising multiple radio transceivers and/or multiple antenna modules for supporting multi-RAT wireless communications without departing from the scope and spirit of this invention. Therefore, in some embodiments of the invention, the communication apparatus may be designed to support a multi-card application, in either a single-standby or a multiple-standby manner, by making some alterations and modifications.

It should be further noted that the subscriber identity card 140 may be dedicated hardware cards as described above, or in some embodiments of the invention, there may be virtual cards, such as individual identifiers, numbers, addresses, or the like which are burned in the internal memory device of the corresponding modem and are capable of identifying the communication apparatus. Therefore, the invention should not be limited to what is shown in FIG. 1.

It should be further noted that in some embodiments of the invention, the communication apparatus may further support multiple IMSIs.

Figure 2:
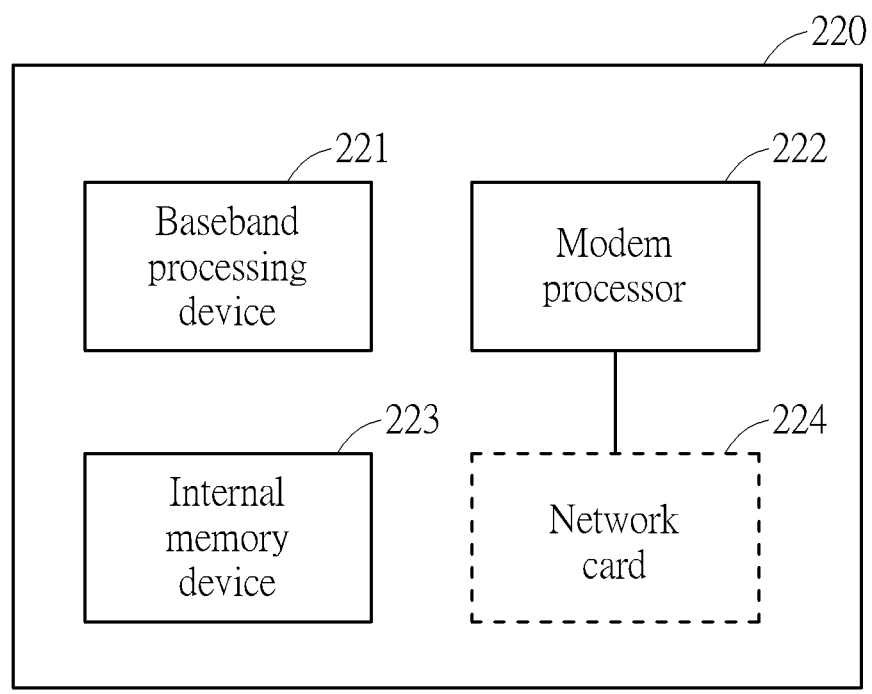
FIG. 2 is an exemplary block diagram of a modem according to an embodiment of the invention.

FIG. 2 is an exemplary block diagram of a modem 220 according to an embodiment of the invention. The modem 220 may be the modem 120 shown in FIG. 1 and may comprise at least a baseband processing device 221, a processor 222 (to discriminate from the "application processor" shown in FIG. 1, hereinafter named the "modem processor"), an internal memory device 223 and a network card 224. The baseband processing device 221 may receive the IF or baseband signals from the radio transceiver 110 and perform IF or baseband signal processing. For example, the baseband processing device 221 may convert the IF or baseband signals into a plurality of digital signals, and process the digital signals, and vice versa. The baseband processing device 221 may comprise a plurality of hardware devices to perform signal processing, such as an analog-to-digital converter for ADC conversion, a digital-to-analog converter for DAC conversion, an amplifier for gain adjustment, a modulator for signal modulation, a demodulator for signal demodulation, an encoder for signal encoding, a decoder for signal decoding, and so on.

According to an embodiment of the invention, the baseband processing device 221 may be designed to have the capability of handling the baseband signal processing operations for different RATs and processing the corresponding IF or baseband signals in compliance with the corresponding communication protocols, so as to support the multi-RAT wireless communications. According to another embodiment of the invention, the baseband processing device 221 may comprise a plurality of sub-units, each being designed to have the capability of handling the baseband signal processing operations of one or more specific RATs and processing the corresponding IF or baseband signals in compliance with the corresponding communication protocols, so as to support the multi-RAT wireless communications. Therefore, the invention should not be limited to any specific way of implementation.

The modem processor 222 may control the operations of the modem 220. According to an embodiment of the invention, the modem processor 222 may be arranged to execute the program codes of the corresponding software module of the modem 220. The modem processor 222 may maintain and execute the individual tasks, threads, and/or protocol stacks for different software modules. In an embodiment, a protocol stack may be implemented so as to respectively handle the radio activities of one RAT. However, it is also possible to implement more than one protocol stack to handle the radio activities of one RAT at the same time, or implement only one protocol stack to handle the radio activities of more than one RAT at the same time, and the invention should not be limited thereto.

The modem processor 222 may also read data from the subscriber identity card coupled to the modem, such as the subscriber identity card 140, and write data to the subscriber identity card. The internal memory device 223 may store system data and user data for the modem 220. The modem processor 222 may also access the internal memory device 223.

The network card 224 provides Internet access services for the communication apparatus. It should be noted that, although the network card 224 shown in FIG. 2 is configured inside of the modem, the invention should not be limited thereto. In some embodiments of the invention, the communication apparatus may also comprise a network card configured outside of the modem, or the communication apparatus may also be coupled to an external network card for providing Internet access services. In some embodiments of the invention, the network card 224 may be a virtual network card, instead of a tangible card, that is created by the operating system of the communication apparatus 100. Therefore, the invention should not be limited to any specific implementation method.

It should be noted that, in order to clarify the concept of the invention, FIG. 2 presents simplified block diagrams in which only the elements relevant to the invention are shown. Therefore, the invention should not be limited to what is shown in FIG. 2.

It should be further noted that in some embodiments of the invention, the modem 220 may also comprise more than one processor and/or more than one baseband processing device. For example, the modem 220 may comprise multiple processors and/or multiple baseband processing devices for supporting multi-RAT operations. Therefore, the invention should not be limited to what is shown in FIG. 2.

It should be further noted that in some embodiments of the invention, the baseband processing device 221 and the modem processor 222 may be integrated into one processing unit, and the modem may comprise one or multiple such processing units, for supporting multi-RAT operations. Therefore, the invention should not be limited to what is shown in FIG. 2.

According to an embodiment of the invention, the modem processor 222 and the application processor 130 may comprise a plurality of logics designed for handling one or more functionalities. The logics may be configured to execute the program codes of one or more software and/or firmware modules, thereby performing the corresponding operations. When performing the corresponding operations by executing the corresponding programs, the logics may be regarded as dedicated hardware devices or circuits, such as dedicated processor sub-units. Generally, the modem processor 222 may be configured to perform operations of relative lower protocol layers while the application processor 130 may be configured to perform operations of relative higher protocol layers. Therefore, in some embodiments of the invention, the application processor 130 may be regarded as the upper layer entity or upper layer processing circuit with respect to the modem processor 222 and the modem processor 222 may be regarded as the lower layer entity or lower layer processing circuit with respect to the application processor 130.

Figure 3:
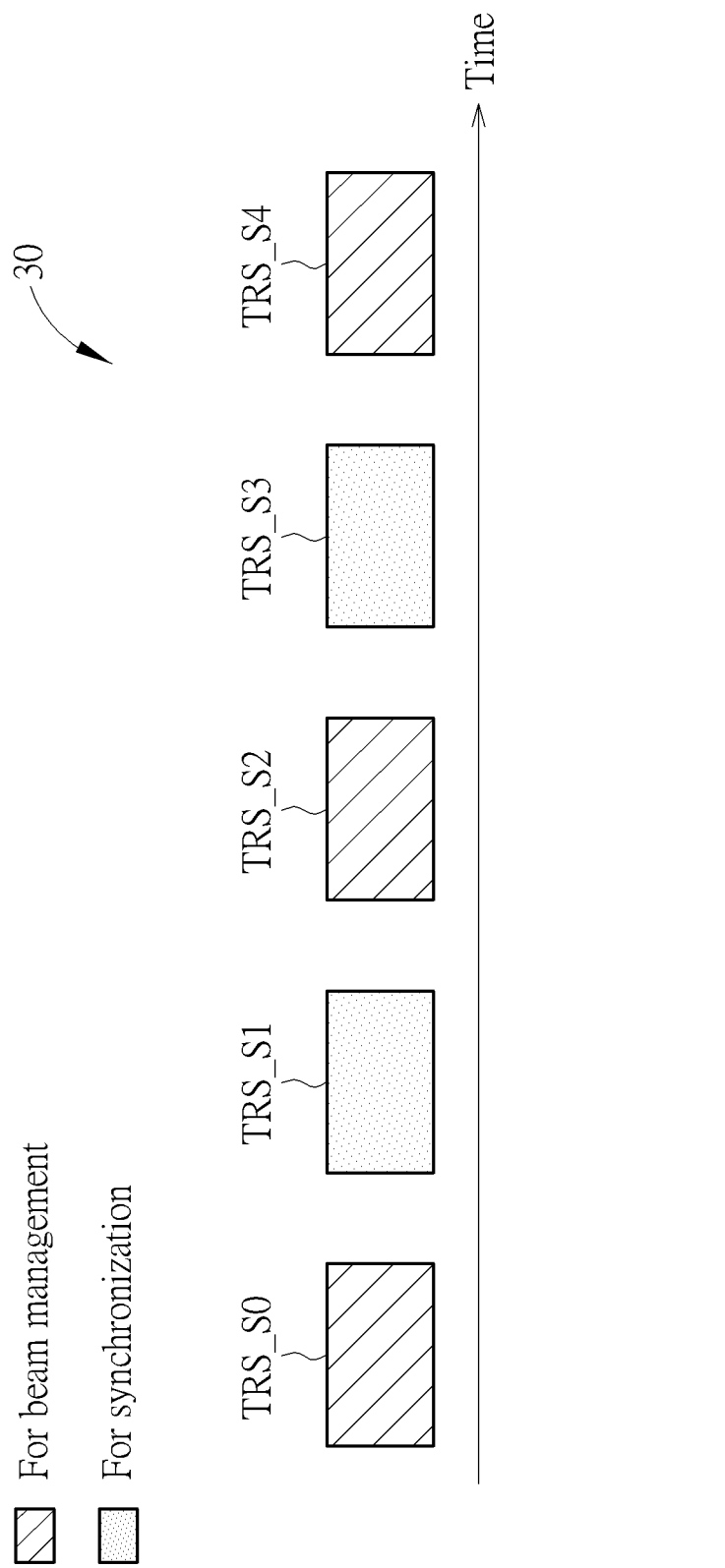
FIG. 3 is a schematic diagram of a tracking reference signal scheduling method according to an embodiment of the invention.

FIG. 3 is a schematic diagram of a TRS scheduling method 30 according to an embodiment of the invention. A communication apparatus (e.g., the communication apparatus 100) handles 5 TRS sets TRS_S0~TRS_S4, to perform the beam management and the synchronization. The communication apparatus schedules the TRS sets TRS_S0, TRS_S2 and TRS_S4 for the beam management, and schedules the TRS sets TRS_S1 and TRS_S3 for the synchronization. That is, the TRS sets TRS_S0~TRS_S4 are scheduled for the beam management and the synchronization alternatively.

Figure 4:
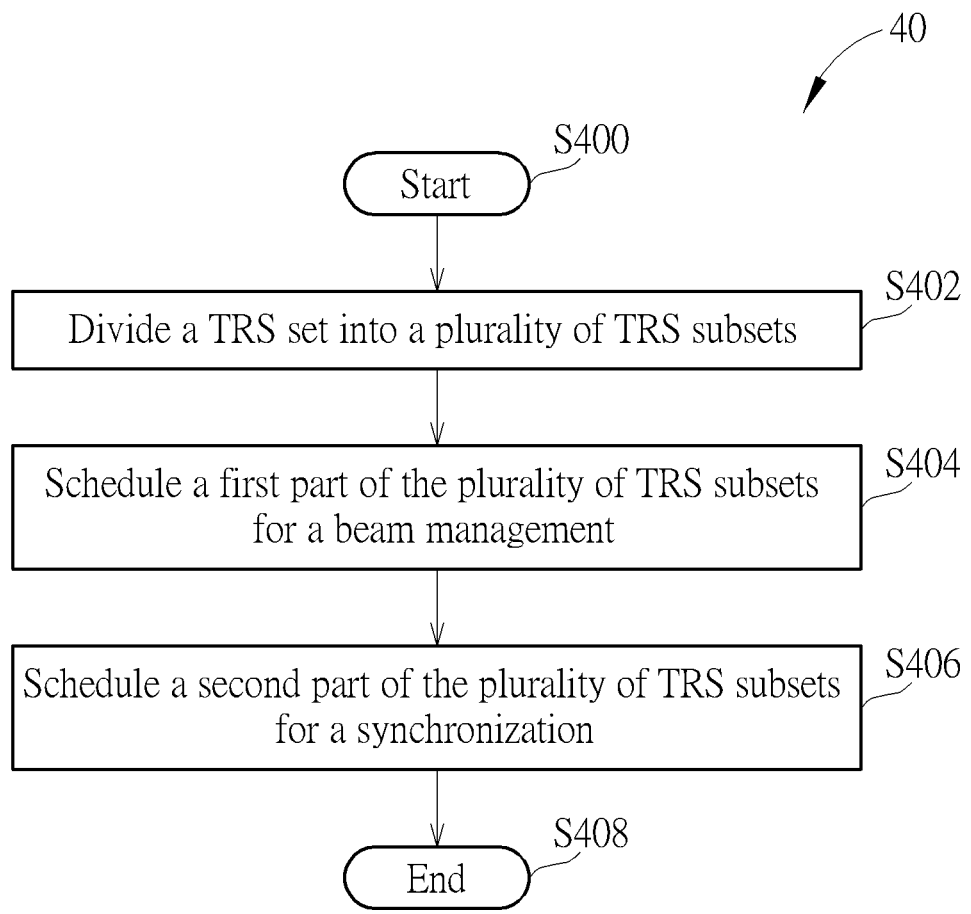
FIG. 4 is a flowchart of a process according to an embodiment of the invention.

FIG. 4 is a flowchart of a process 40 utilized in a communication apparatus (e.g., the communication apparatus 100 shown in FIG. 1) according to an embodiment of the invention, to handle a tracking reference signal (TRS) scheduling. The process 40 comprises the following steps:

Step S400: Start.
Step S402: Divide a TRS set into a plurality of TRS subsets.
Step S404: Schedule a first part of the plurality of TRS subsets for a beam management.
Step S406: Schedule a second part of the plurality of TRS subsets for a synchronization.
Step S408: End.

According to the process 40, the TRS set is scheduled for both the beam management and the synchronization. Therefore, the beam management and the synchronization are operated in the same TRS set. The data rate and the power consumption can be improved.

Realization of the process 40 is not limited to the above description. The following embodiments of the invention may be applied to realize the process 40.

In an embodiment of the invention, a third part of the plurality of TRS subsets is not available (N/A). That is, at least one TRS subset of the TRS set is not scheduled for the beam management and the synchronization.

In an embodiment of the invention, the communication apparatus schedules a fourth part of the plurality of TRS subsets for at least one measurement (e.g., at least one of a control element (CE) measurement, a network element (NE) measurement, a channel state information (CSI) measurement, a radio link monitoring (RLM) measurement or a Layer 1 Reference Symbol Received Power (L1-RSRP) measurement).

In an embodiment of the invention, the first part of the plurality of TRS subsets comprises a plurality of first non-continuous TRS subsets. In an embodiment of the invention, the first part of the plurality of TRS subsets comprises a plurality of first continuous TRS subsets. In an embodiment of the invention, the second part of the plurality of TRS subsets comprises a plurality of second non-continuous TRS subsets. In an embodiment of the invention, the second part of the plurality of TRS subsets comprises a plurality of second continuous TRS subsets.

In an embodiment of the invention, the third part of the plurality of TRS subsets comprises at least one TRS subset. In an embodiment of the invention, the third part of the plurality of TRS subsets comprises a plurality of third non-continuous TRS subsets. In an embodiment of the invention, the third part of the plurality of TRS subsets comprises a plurality of third continuous TRS subsets. In an embodiment of the invention, the fourth part of the plurality of TRS subsets comprises a plurality of fourth non-continuous TRS subsets. In an embodiment of the invention, the fourth part of the plurality of TRS subsets comprises a plurality of fourth continuous TRS subsets.

In an embodiment of the invention, the first part of the plurality of TRS subsets and the second part of the plurality of TRS subsets are overlapped (partially or completely). In an embodiment of the invention, the first part of the plurality of TRS subsets and the second part of the plurality of TRS subsets are not overlapped. In an embodiment of the invention, the first part of the plurality of TRS subsets and the fourth part of the plurality of TRS subsets are overlapped (partially or completely). In an embodiment of the invention, the first part of the plurality of TRS subsets and the fourth part of the plurality of TRS subsets are not overlapped. In an embodiment of the invention, the second part of the plurality of TRS subsets and the fourth part of the plurality of TRS subsets are overlapped (partially or completely). In an embodiment of the invention, the second part of the plurality of TRS subsets and the fourth part of the plurality of TRS subsets are not overlapped.

In an embodiment of the invention, the TRS set comprises a plurality of TRS symbols (e.g., 2 TRS symbols).

Figure 5:
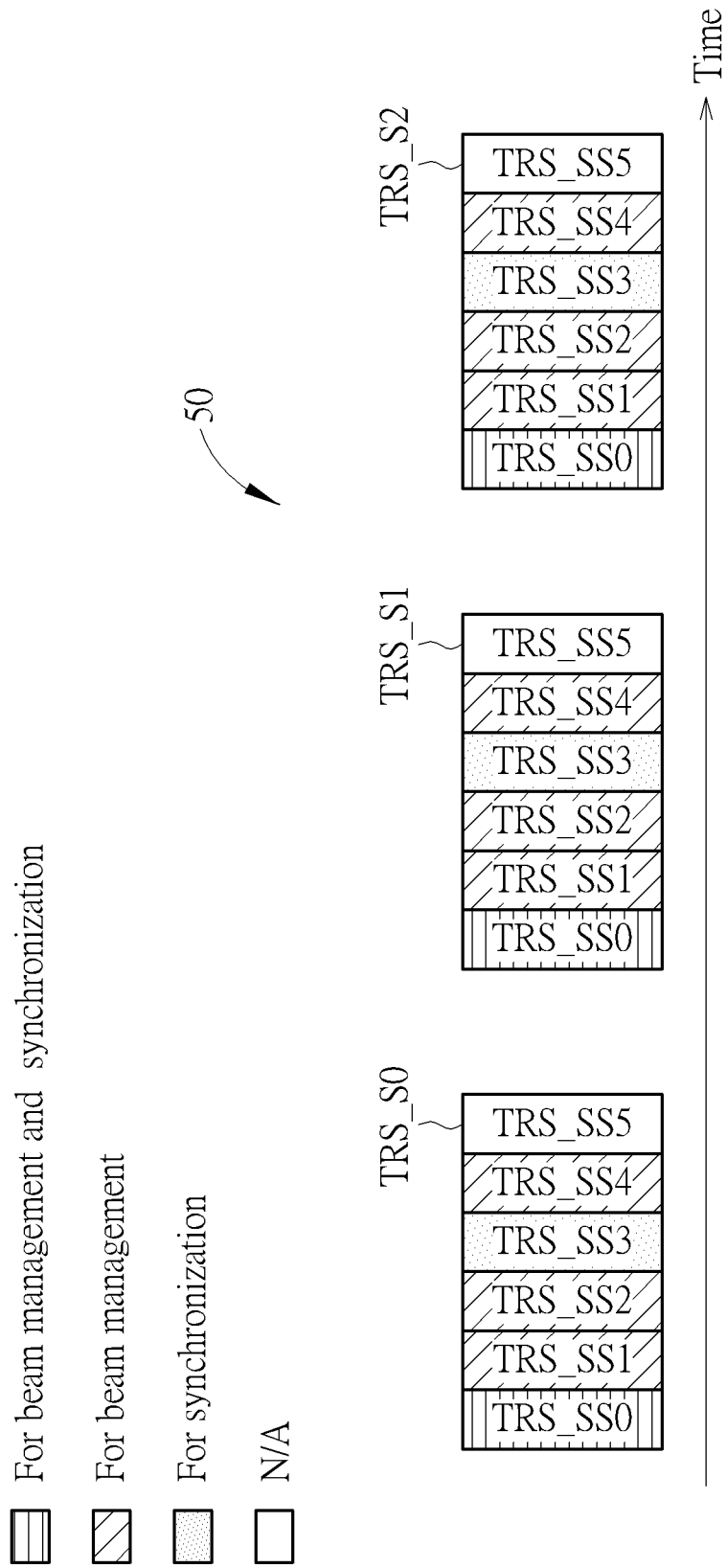
FIG. 5 is a schematic diagram of a tracking reference signal scheduling method according to an embodiment of the invention.

FIG. 5 is a schematic diagram of a TRS scheduling method 50 according to an embodiment of the invention. A communication apparatus (e.g., the communication apparatus in the process 40) handles 3 TRS sets TRS_S0~TRS_S2, to perform the beam management and the synchronization. Each TRS set is divided into 6 TRS subsets TRS_SS0~TRS_SS5 (e.g., divided equally). The communication apparatus schedules the TRS subset TRS_SS0 for both the beam management and the synchronization, schedules the TRS subsets TRS_SS1, TRS_SS2 and TRS_SS4 for the beam management, and schedules the TRS subset TRS_SS3 for the synchronization. The TRS subset TRS_SS5 is N/A (e.g., is not scheduled for the beam management and the synchronization). That is, the beam management and the synchronization are operated jointly in the same TRS set. Therefore, the TRS scheduling method 50 provides a better data rate and a lower power consumption than the TRS scheduling method 30 in FIG. 3.

Figure 6:
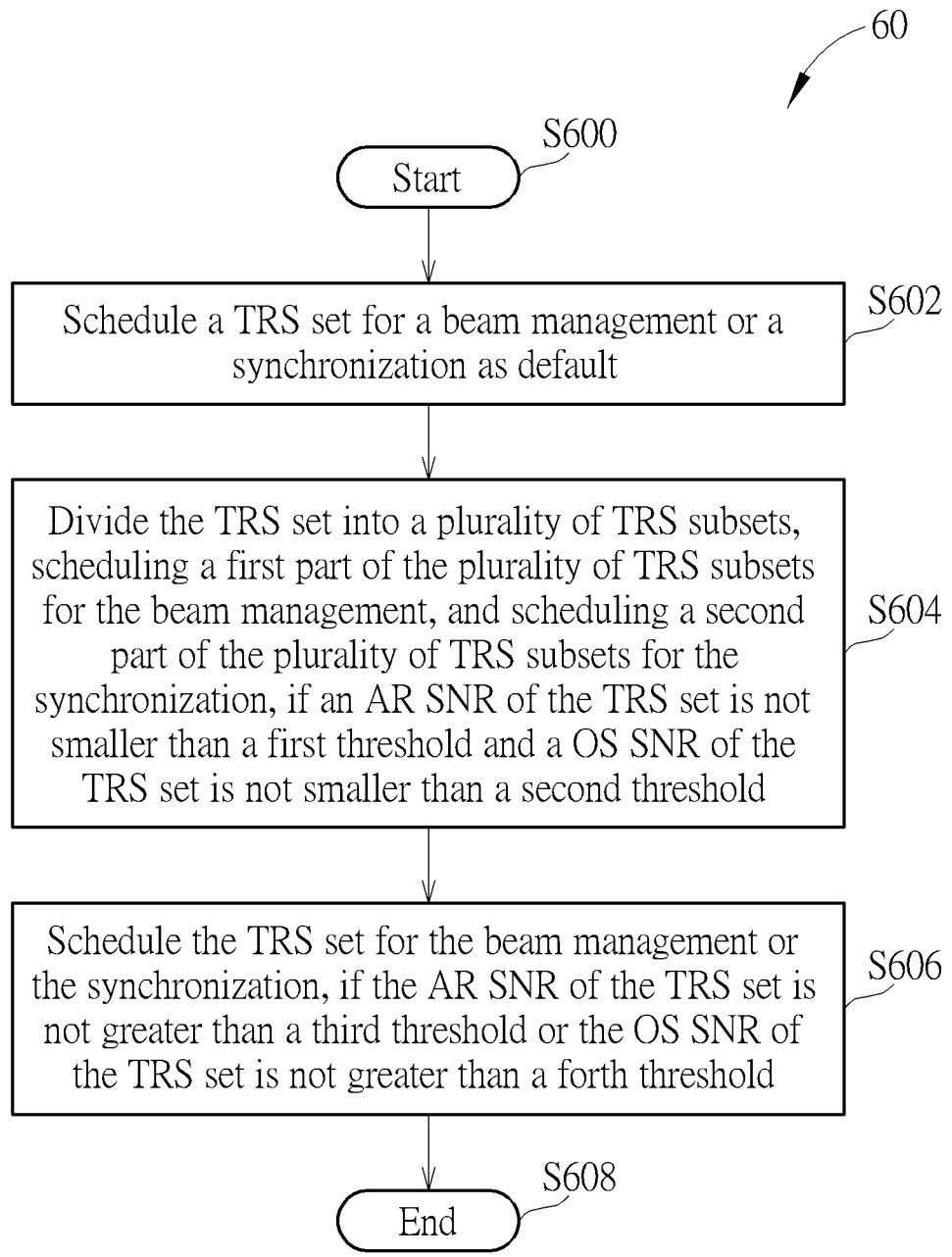
FIG. 6 is a flowchart of a process according to an embodiment of the invention.

FIG. 6 is a flowchart of a process 60 utilized in a communication apparatus (e.g., the communication apparatus 100 shown in FIG. 1) according to an embodiment of the invention, to handle a TRS scheduling. The process 60 comprises the following steps:

Step S600: Start.

Step S602: Schedule a TRS set for a beam management or a synchronization as default.

Step S604: Divide the TRS set into a plurality of TRS subsets, scheduling a first part of the plurality of TRS subsets for the beam management, and scheduling a second part of the plurality of TRS subsets for the synchronization, if an average (AR) signal-to-noise ratio (SNR) of the TRS set is not smaller than a first threshold and a one-shot (OS) SNR of the TRS set is not smaller than a second threshold.

Step S606: Schedule the TRS set for the beam management or the synchronization, if the AR SNR of the TRS set is not greater than a third threshold or the OS SNR of the TRS set is not greater than a forth threshold.

Step S608: End.

According to the process 60, the TRS set is scheduled for both the beam management and the synchronization, when having a better SNR. The TRS set is scheduled for the beam management or the synchronization, when having a worse SNR. Therefore, the communication apparatus schedules the TRS set dynamically according to the AR SNR and the OS SNR, to ensure the performance in a low SNR scenario.

The embodiments of the invention in the process 40 can be applied to realize the process 60, and are not narrated herein.

Figure 7:
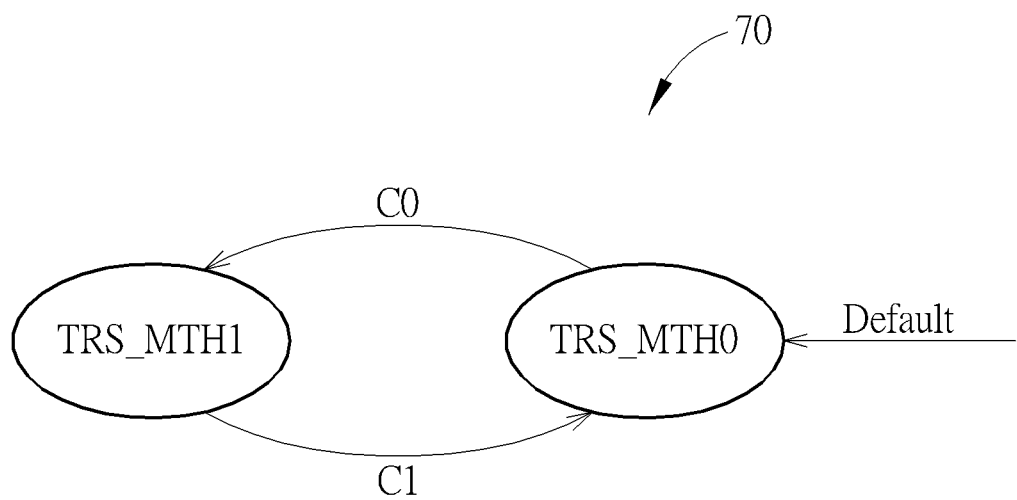
FIG. 7 is a schematic diagram of a tracking reference signal scheduling method according to an embodiment of the invention.

FIG. 7 is a schematic diagram of a TRS scheduling method 70 according to an embodiment of the invention. A TRS scheduling method TRS_MTH0 includes scheduling a TRS set for a beam management or a synchronization (e.g., the TRS scheduling method 30 shown in FIG. 3). A TRS scheduling method TRS_MTH1 includes dividing the TRS set into a plurality of TRS subsets, scheduling a first part of the plurality of TRS subsets for the beam management, and scheduling a second part of the plurality of TRS subsets for the synchronization (e.g., the TRS scheduling method 50 shown in FIG. 5). A condition C0 includes that both an AV SNR and an OS SNR are not smaller than 6 dB. A condition C1 includes that the AV SNR is not greater than 0 dB or the OS SNR is not greater than −3 dB. In detail, the communication apparatus schedules the TRS set according to the TRS scheduling method TRS_MTH0 as default. Then, the communication apparatus schedules the TRS set according to the TRS scheduling method TRS_MTH1 instead of the TRS scheduling method TRS_MTH0, when the condition C0 is satisfied. The communication apparatus schedules the TRS set according to the TRS scheduling method TRS_MTH0 instead of the TRS scheduling method TRS_MTH1, when the condition C1 is satisfied. That is, the communication apparatus selects the TRS scheduling methods TRS_MTH0 and TRS_MTH1 dynamically according to the AR SNR and the OS SNR, to schedule the TRS set.

To sum up, the present invention provides a communication apparatus and a method for handling a TRS scheduling. The beam management and the synchronization are operated jointly in the same TRS set, to improve the data rate and the power consumption.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication apparatus, comprising:
a radio transceiver, transmitting or receiving wireless signals in a wireless network; and
a modem processor, coupled to the radio transceiver and configured to perform operations comprising:
dividing a tracking reference signal (TRS) set into a plurality of TRS subsets;
scheduling a first part of the plurality of TRS subsets for a beam management;
scheduling a second part of the plurality of TRS subsets for a synchronization; and
scheduling a fourth part of the plurality of TRS subsets for at least one measurement, wherein the second part of the plurality of TRS subsets and the fourth part of the plurality of TRS subsets are overlapped.

2. The communication apparatus of claim 1, wherein a third part of the plurality of TRS subsets is not available (N/A).

3. The communication apparatus of claim 1, wherein the at least one measurement comprises at least one of a control element (CE) measurement, a network element (NE) measurement, a channel state information (CSI) measurement, a radio link monitoring (RLM) measurement or a Layer 1 Reference Symbol Received Power (L1-RSRP) measurement.

4. The communication apparatus of claim 1, wherein the first part of the plurality of TRS subsets comprises a plurality of first non-continuous TRS subsets.

5. The communication apparatus of claim 1, wherein the second part of the plurality of TRS subsets comprises a plurality of second non-continuous TRS subsets.

6. The communication apparatus of claim 1, wherein the first part of the plurality of TRS subsets and the second part of the plurality of TRS subsets are overlapped.

7. The communication apparatus of claim 1, wherein the TRS set comprises a plurality of TRS symbols.

8. A communication apparatus, comprising:
a radio transceiver, transmitting or receiving wireless signals in a wireless network; and
a modem processor, coupled to the radio transceiver and configured to perform operations comprising:
scheduling a tracking reference signal (TRS) set for a beam management or a synchronization as default;
dividing the TRS set into a plurality of TRS subsets, scheduling a first part of the plurality of TRS subsets for the beam management, and scheduling a second part of the plurality of TRS subsets for the synchronization, if an average (AR) signal-to-noise ratio (SNR) of the TRS set is not smaller than a first threshold and a one-shot (OS) SNR of the TRS set is not smaller than a second threshold; and
scheduling the TRS set for the beam management or the synchronization, if the AR SNR of the TRS set is not greater than a third threshold or the OS SNR of the TRS set is not greater than a forth threshold.

9. The communication apparatus of claim 8, wherein a third part of the plurality of TRS subsets is not available (N/A).

10. The communication apparatus of claim 8, wherein the communication apparatus schedules a fourth part of the plurality of TRS subsets for at least one measurement.

11. The communication apparatus of claim 10, wherein the at least one measurement comprises at least one of a control element (CE) measurement, a network element (NE) measurement, a channel state information (CSI) measurement, a radio link monitoring (RLM) measurement or a Layer 1 Reference Symbol Received Power (L1-RSRP) measurement.

12. The communication apparatus of claim 10, wherein the second part of the plurality of TRS subsets and the fourth part of the plurality of TRS subsets are overlapped.

13. The communication apparatus of claim 8, wherein the first part of the plurality of TRS subsets comprises a plurality of first non-continuous TRS subsets.

14. The communication apparatus of claim 8, wherein the second part of the plurality of TRS subsets comprises a plurality of second non-continuous TRS subsets.

15. The communication apparatus of claim 8, wherein the first part of the plurality of TRS subsets and the second part of the plurality of TRS subsets are overlapped.

16. The communication apparatus of claim 8, wherein the TRS set comprises a plurality of TRS symbols.

17. A method for handling a tracking reference signal (TRS) scheduling, comprising:
dividing a tracking reference signal set into a plurality of TRS subsets;
scheduling a first part of the plurality of TRS subsets for a beam management;
scheduling a second part of the plurality of TRS subsets for a synchronization; and
scheduling a fourth part of the plurality of TRS subsets for at least one measurement, wherein the second part of the plurality of TRS subsets and the fourth part of the plurality of TRS subsets are overlapped.

18. A method for handling a tracking reference signal (TRS) scheduling, comprising:
scheduling a tracking reference signal set for a beam management or a synchronization as default;
dividing the TRS set into a plurality of TRS subsets, scheduling a first part of the plurality of TRS subsets for the beam management, and scheduling a second part of the plurality of TRS subsets for the synchronization, if an average (AR) signal-to-noise ratio (SNR) of the TRS set is not smaller than a first threshold and a one-shot (OS) SNR of the TRS set is not smaller than a second threshold; and
scheduling the TRS set for the beam management or the synchronization, if the AR SNR of the TRS set is not greater than a third threshold or the OS SNR of the TRS set is not greater than a forth threshold.

\* \* \* \* \*